J. G. PAULIN.
FLUID PRESSURE INDICATOR.
APPLICATION FILED DEC. 1, 1916.
1,315,858.
Patented Sept. 9, 1919.
2 SHEETS—SHEET 1.
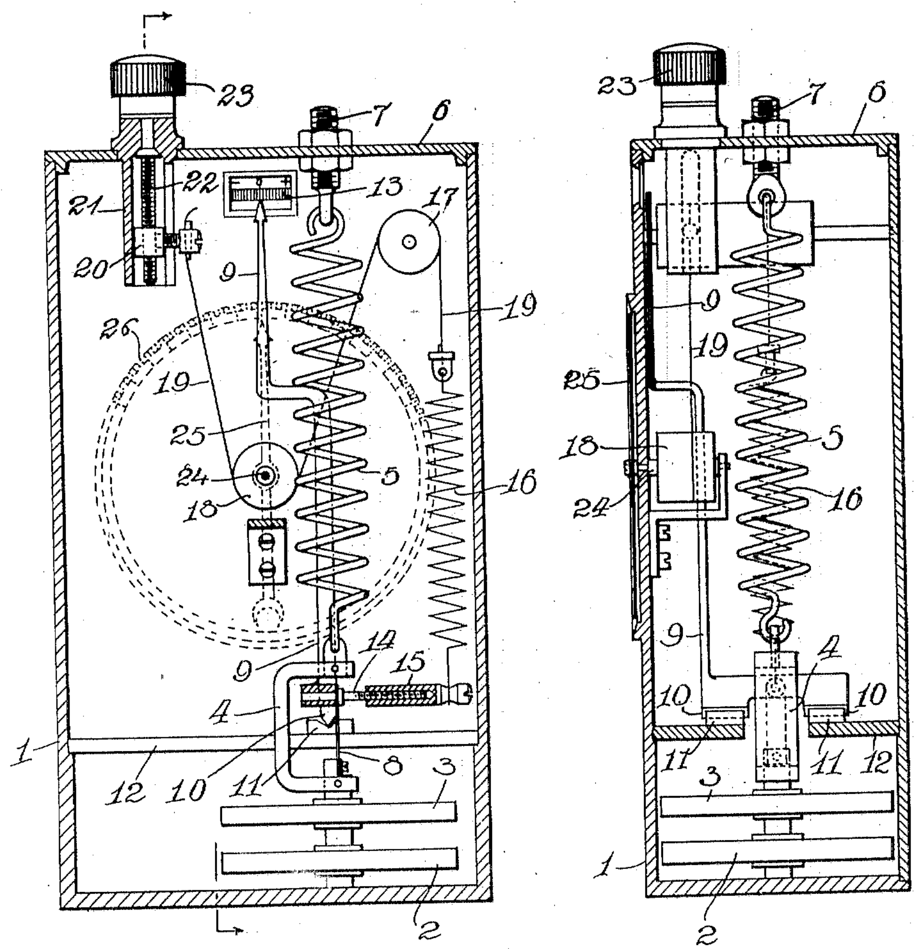
Witness
E. J. Sheehy.
Inventor
J. G. Paulin
by James J. Sheehy & Co.,
Attys.

J. G. PAULIN.
FLUID PRESSURE INDICATOR.
APPLICATION FILED DEC. 1, 1916.
1,315,858.
Patented Sept. 9, 1919.
2 SHEETS—SHEET 2.
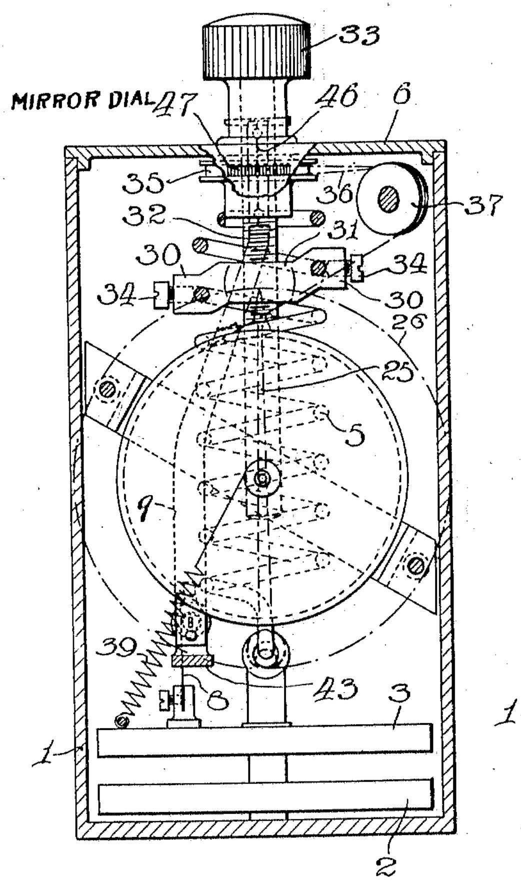
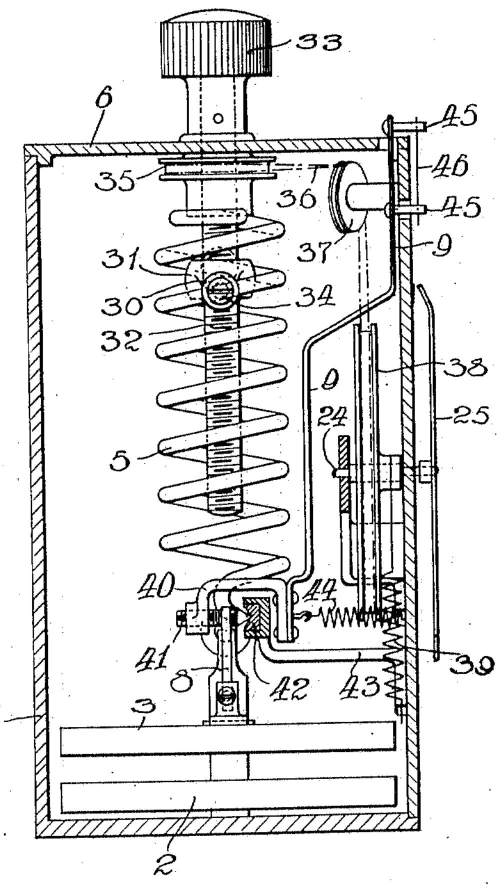
Witness
E. J. Sheehy.
Inventor
J. G. Paulin
by James J. Sheehy Co.
Attys.

UNITED STATES PATENT OFFICE.

JOSUA GABRIEL PAULIN, OF STOCKHOLM, SWEDEN.

FLUID-PRESSURE INDICATOR.

1,315,858. Specification of Letters Patent. Patented Sept. 9, 1919.

Application filed December 1, 1916. Serial No. 134,373.

*To all whom it may concern:*

Be it known that I, JOSUA GABRIEL PAULIN, a citizen of the Kingdom of Sweden, residing at Stockholm, Sweden, have invented new and useful Improvements in Fluid-Pressure Indicators, of which the following is a specification.

This invention relates to fluid pressure indicators and more particularly to indicators of that type in which the fluid actuates a diaphragm or the like.

In fluid pressure indicators hitherto known which are provided with a diaphragm exposed to the pressure of a fluid, as for instance the atmospheric air, a gas or a liquid, the diaphragm offers a variable resistance to the pressure, according as the diaphragm is more or less deflected. Besides, the gear, which operates a pointer indicating the movements of the diaphragm, is generally connected directly with the diaphragm, and since the ratio of transmission of said gear has to be limited within rather narrow limits, small movements of the diaphragm will be hardly perceptible at the pointer. Moreover, the resistance of said gear is rather inconstant.

The object of the invention is to construct a fluid pressure indicator having a diaphragm, so as to overcome the difficulties above referred to.

A further object of the invention is to provide a fluid pressure indicator of the aforesaid type, in which the diaphragm is connected with a spring balancing device counteracting the fluid pressure, and with a device adapted to adjust the diaphragm to a certain central position, said adjusting device gearing with a dial device indicating the pressure, while the diaphragm is connected with another dial device indicating the degree of adjustment, when the diaphragm is brought back to said central position. According to the magnitude of the pressure to be measured the spring load is to be changed, so as to permit the diaphragm to return to its central position, and on changing said spring load the corresponding dial device is actuated thus indicating the pressure, after the adjustment has been effected.

The invention will hereinafter be described, reference being had to the accompanying drawings, in which:—

Figures 1 and 2 are vertical partial sections at right angles to each other of a barometer embodying the invention. Figs. 3 and 4 are similar views of another embodiment of said barometer.

Referring first to Figs. 1 and 2, 1 is a casing inclosing a diaphragm device consisting of two diaphragm boxes 2 and 3 connected with each other and evacuated when the apparatus, as shown in the drawings, is used as a barometer. The lower box 2 is secured to the bottom of the casing 1, while the upper box 3 is connected, by means of a yoke 4, with a strong spiral spring 5, which is secured at the top to a screw passed through the cover 6 of the casing 1, said spring tending to expand the boxes 2 and 3 against the action of the air pressure actuating the diaphragms. By means of a strip 8 the upper box 3 is connected with a long pointer 9 resting with knife-edges 10 on corresponding blocks 11, which are secured to a horizontal partition 12 in the casing 1. The strip 8 is situated at the side of the vertical plane through the edges 10 and at a short distance therefrom, and owing thereto the boxes operate the pointer by a short lever, and therefore a slight movement of the boxes will effect a relatively great movement of the free end of the pointer 9. Said strip 8 is attached by any suitable means such as a rivet or screw to the pin 41, Fig. 4, hereinafter described. I have not, however, deemed it necessary to illustrate the fastening means as it may be of any description compatible with the purpose of the invention. The pointer 9 moves along a dial 13 secured in an aperture in the front wall of the casing 1, the central division of the dial corresponding to the central position of the diaphragms and suitably marked with 0. The portion of the dial passed by the pointer 9 from said mark, at the compression of the diaphragm boxes, may suitably be marked with + and the other side of the dial corresponding to the expansion of the boxes with —.

The pointer 9 is provided with an adjustable, lateral arm consisting of a screw 14 secured to the pointer and a threaded sleeve 13 screwed onto said screw and connected with one end of a weak spiral spring 16, the other end of which is attached to a ribbon, cord or the like 19 passed over rollers 17 and 18 and connected with a nut 20, which may be adjusted in vertical direction. Said nut is slidably mounted in a guide 21 secured to the cover 6, the nut being prevented from turning in said guide. The vertical adjustment of the nut 20 is effected by means of the screw 22 provided outside the casing with a knob 23. The lateral arm 14, 15 and the spring 16 are so positioned, that the spring, just as the spring 5, counteracts the compression of the diaphragm boxes.

Secured to the pivot pin 24 of the roller 18—which pin is passed through the front wall of the casing 1—is a pointer 25 movable along a dial 26.

The device described above operates as follows:

If it be supposed that the apparatus is adjusted so as to assume the position shown in the drawing, in which the diaphragm boxes are in the central position—that is to say in the position, for instance, corresponding to the middle air pressure—and the pointer 9 in front of the zero-division of the dial 13, while the pointer 25 indicates the division of dial 26 corresponding to the temporary air pressure. If the air pressure be changed, as for instance increased, the boxes 2 and 3 are compressed thus stretching the spring 5, and by turning the pointer 9 to + also stretching the spring 16, until equilibrium is effected. By being turned to +, the pointer 9 indicates, that an increase of the pressure has taken place. The pointer 25 has not, however, been actuated by said movement of the diaphragm boxes, and on account thereof it indicates still the previous air pressure. If the new air pressure is to be read off, the screw 22 is so turned by means of the knob 23, that the nut 20 moves upward thus stretching the spring 16 by the aid of the ribbon 19, until said spring 16 has moved the pointer 9 back to zero-position. Thereby the boxes 2 and 3 are restored to the former position. During this regulation of the tension of spring 16 the pointer 25 is moved by means of the ribbon 19, so as to indicate on the dial 26 after the adjustment the temporary air pressure. The pointer 25 remains in this position, until the next reading is effected. It will be understood that because the spring 16, is a weakened spring, the pointer 25 will not be moved over the dial when said spring is stretched by downward movement of member 15. On the other hand, I would have it distinctly understood that movement of said pointer 25, through the medium of roller 18, and ribbon 19 is effected only by manipulation of the knob 23. Consequently, after each reading exact information regarding the air pressure prevailing at the preceding reading may be obtained.

If the air pressure decreases, the movements take place in the opposite direction; in other respects the apparatus operates in analogy with what is stated above.

The gear controlling the pointer 25 can be so chosen, that a very large movement of the pointer corresponds to a small increase or decrease of the pressure actuating the diaphragms, inasmuch as said gear has no influence on the sensitiveness of the diaphragm boxes and, therefore, may be sized without regard to the boxes. The pressure may, consequently, be determined with any degree of exactness. Because of the boxes being brought back, at each reading, to a fixed position, the deflection of the pointer 25 is independent of the elasticity of the boxes and solely dependent on the spring 16. If the latter be made, so as to possess a tension increasing in proportion to the elongation, the deflections of the pointer 25 become proportional to the changes of pressure, and then an equally divided dial may be used. If a long lever 14, 15 be used in connection with the spring 16, said spring can be made very weak, and owing thereto the adjustment of the tension of the spring can be easily effected, and, besides, a large elongation of the spring and, consequently, a large movement of the ribbon 19 are obtained at such adjustment. The necessary adjustments of the spring load may be effected, on the one hand, by the aid of the screw 7 and, on the other hand, by changes of the length of the lever 14, 15.

Instead of using, as in the embodiment described above, a spring load counteracting the air pressure consisting of a strong spring, which is not adjusted at the reading, and a weak spring, whose tension is adjusted at each reading, one spring only may be used, which in such case is made rather strong, the adjustment being effected directly on said spring. An embodiment of a barometer provided with such a spring load is illustrated in Figs. 3 and 4.

The lower diaphragm box 2 is, as described above, secured to the bottom of the casing 1, while the upper box 3 is loaded with a strong spiral spring 5 tending to expand the boxes against the action of the air pressure. The spring 5 extends through recesses formed in accordance with the pitch of the spring in two diametrically opposite projections 30 of a nut 31 screwed onto a screw 32 passing centrally through the spring and journaled in the cover 6 of the casing 1, said screw being provided outside the cover with a knob 33. The nut 31 may be held in adjusted position on the spring 5 by means of screws 34, in order to adjust the operative length of the spring. The upper end of the spring is freely supported. A guiding device, not shown, may, if desired, be disposed in order to prevent the nut 31 and the spring from turning, after the nut has been adjusted in the desired position. Splined to the screw 32 is a rope pulley 35 to the periphery of which a rope or ribbon 36 is secured and then passed over a pulley 37, the end of the rope or ribbon being secured to the periphery of a rope pulley 38 attached to the pivot pin 24 of the pointer 25. A spring 39 connected with the hub of the pulley 38 serves to actuate the pulley 38, so as to keep the rope 36 stretched.

The pointer 9 indicating the position of the diaphragms is secured to a yoke 40 into which a horizontal pin 41 is screwed, said pin engaging with a conical point in a correspondingly formed block 42 which is supported by a bracket 43 attached to the casing 1. The yoke 40 is actuated by a spring 44 tending to hold the pin 41 in engagement with said block 42. A ribbon 8 connects the upper box with the periphery of the pin 41; said ribbon being attached to pin 41 as before described. The pointer 9 is adapted for mirror reading and for this purpose provided with two lateral projections 45 extending through apertures in the front wall of the casing 1 and between which a fine cord 46 is stretched and placed in front of a mirror dial 47, Fig. 3, disposed on the front wall of the casing thus insuring an exact reading.

The operation of this apparatus is analogous to that of the apparatus shown in Figs. 1 and 2.

If it be supposed that the apparatus is so adjusted that the boxes 2 and 3, at the temporary air pressure, are in the normal position and that the pointer 9, consequently, is in position in front of the zero-division of the dial 47, while the pointer 25 indicates the division of the dial 26 corresponding to said pressure. If the pressure be changed, as for instance increased, the diaphragm boxes are compressed and the spring 5 is stretched, while the ribbon 8 is moved downward. Owing thereto, the ribbon 8 turns the pin 41 together with the yoke 40 and the pointer 9. At the reading of the new pressure, the screw 32 is turned by means of the knob 33, and the nut 31 is moved upward thus stretching the spring 5, until the latter has brought the diaphragm boxes back to their precedent position. At the same time the spring 44 turns, by torsion, the yoke 40 together with the pointer back to the zero-position, the pointer attaining this position, when the boxes have reassumed their former position. On turning the screw 32, the pulley 38 and simultaneously the pointer 25 are turned by the ribbon 36, the pointer 25 thus, after the pointer 9 has been adjusted to zero-position, indicating exactly on the dial 26 the temporary air pressure. At a decrease of the air pressure the movements are effected in opposite direction.

The invention may be applied to apparatus indicating the pressure of any gas or fluid. For this purpose no other change of the apparatus is needed than that the construction of the diaphragm device be adapted to the fluid, the pressure of which is to be determined.

Having now described my invention, what I claim as new and desire to secure by Letters Patent is:

1. A fluid pressure indicator, comprising a diaphragm device exposed to the fluid pressure, elastic means connected with said diaphragm device and counteracting the fluid pressure, means indicating the pressure, adjusting means yieldingly connected with said diaphragm and indicating means and adapted to return the same to a central position, means indicating said return movement independently of the movement of the diaphragm device and means for actuating said adjusting means.

2. A fluid pressure indicator, comprising a diaphragm device exposed to the fluid pressure, a plurality of elastic means connected with said diaphragm device and counteracting the fluid pressure, means indicating the pressure, adjusting means yieldingly connected with said diaphragm device and indicating means and adapted to return the same to a central position, said adjusting means operating part of said elastic means, means indicating said return movement independently of the movement of the diaphragm device, and means for actuating said adjusting means.

3. A fluid pressure indicator, comprising a diaphragm device exposed to the fluid pressure, a plurality of elastic means connected with said diaphragm device and counteracting the fluid pressure, means indicating the pressure, adjusting means yieldingly connected with said diaphragm device and indicating means adapted to return the same to a central position, said adjusting means operating part of said elastic means, an adjustable connection between said part of the elastic means and the diaphragm device, means indicating said return movement independently of the movement of the diaphragm device, and means for actuating said adjusting means.

4. A fluid pressure indicator, comprising a diaphragm device exposed to the fluid pressure, elastic means connected with said diaphragm device and counteracting the fluid pressure, means indicating the pressure, means connected with said elastic means and adapted to vary the magnitude of their operative part, adjusting means yieldingly connected with said diaphragm device and indicating means and adapted to return the same to a central position, means indicating said return movement independently of the movement of the diaphragm device, and means for actuating said adjusting means.

5. A fluid pressure indicator comprising a diaphragm device exposed to the fluid pressure, a spring balancing device connected with said diaphragm device and counteracting the fluid pressure, means indicating the pressure, adjusting means yieldingly connected with said diaphragm device and indicating means and adapted to return the same to a central position, means indicating said return movement independently of the movement of the diaphragm device, and means for actuating said adjusting means.

6. A fluid pressure indicator, comprising a diaphragm device actuated by the fluid pressure, a plurality of springs connected with said diaphragm device and counteracting the fluid pressure, means indicating the pressure, adjusting means yieldingly connected with said diaphragm device and indicating means and adapted to return the same to a central position, said adjusting means operating part of said springs, means indicating said return movement independently of the movement of the diaphragm device, and means for actuating said adjusting means.

7. A fluid pressure indicator, comprising a diaphragm device actuated by the fluid pressure, a spring connected with said diaphragm device and counteracting the fluid pressure, means indicating the pressure, means connected with said spring and adapted to vary the operative length of the same, adjusting means yieldingly connected with said diaphragm device and indicating means and adapted to return the same to a central position, means indicating said return movement independently of the movement of the diaphragm device and means for actuating said adjusting means.

In testimony whereof I have signed my name.

JOSUA GABRIEL PAULIN.